UNITED STATES PATENT OFFICE.

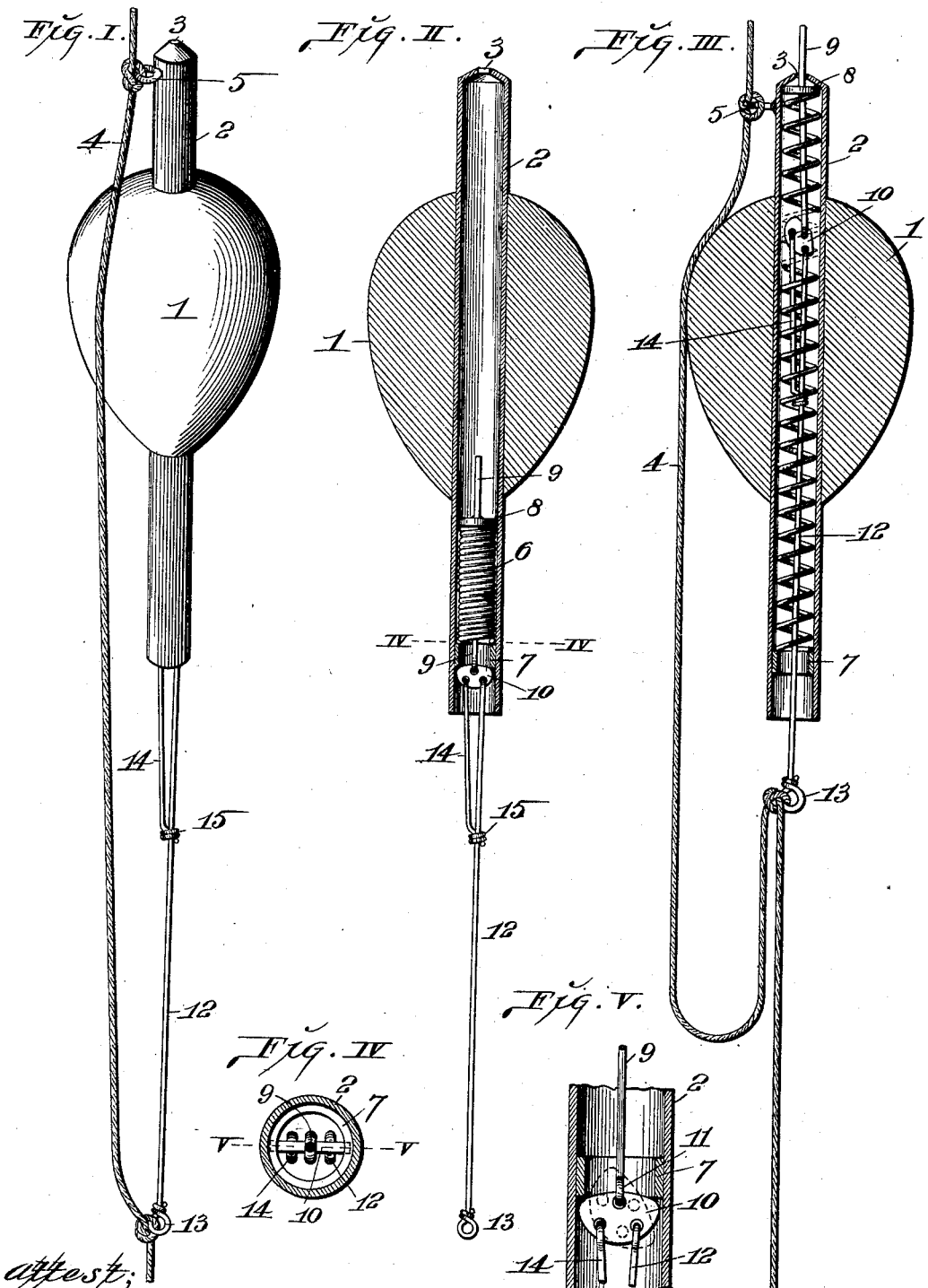

CHRISTOPHER HYMERS, OF ST. LOUIS, MISSOURI.

SELF-STRIKING FISHING-FLOAT.

SPECIFICATION forming part of Letters Patent No. 711,318, dated October 14, 1902.

Application filed April 4, 1902. Serial No. 101,350. (No model.)

*To all whom it may concern:*

Be it known that I, CHRISTOPHER HYMERS, a citizen of the United States, residing in the city of St. Louis, in the State of Missouri, have invented certain new and useful Improvements in Self-Striking Fishing-Floats, of which the following is a full, clear, and exact description, reference being had to the accompanying drawings, forming part of this specification.

My invention relates to a fishing-float containing means to furnish medium that will be actuated by a fish to effect a sudden striking action for the purpose of causing the fish-hook at the end of a fishing-line to be quickly drawn into the mouth of the fish to secure it thereto.

My invention consists in features of novelty hereinafter fully described, and pointed out in the claims.

Figure I is a side view of my float. Fig. II is a longitudinal sectional view taken through the float-bob and spring-incasing tube and showing the spring and parts connected thereto in elevation. Fig. III is a similar view to Fig. II, showing the line-actuating spring expanded. Fig. IV is an enlarged cross-sectional view taken on line IV IV, Fig. II. Fig. V is an enlarged longitudinal sectional view taken on line V V, Fig. IV.

1 designates a bob, and 2 a tube that passes through the bob 1. The tube 2 is open at its lower end and is provided with a restricted aperture 3 at its upper end.

4 is a fishing-line attached to an eye 5, carried by the tube 2 at its upper end.

6 designates an expansion-spring located in the tube 2 and seated upon a supporting-ring 7, which constitutes a shoulder within the tube at its lower end. The upper end of the spring has connected to it a disk 8, in which a pull-rod 9 is fixed, the said rod being extended above the disk 8 and passing downwardly into the center of the spring 6, as seen in Fig. III.

10 designates an elongated rocking trigger centrally connected to said pull-rod by means of an eye 11 at the lower end of the rod, that is loosely seated in said trigger.

12 designates a pull-wire loosely mounted at one side of the center of the elongated rocking trigger 10 and having at its lower end an eye 13, that receives the connection of the fishing-line 4.

14 is a setting-wire loosely connected to the rocking trigger 10 at the opposite side of its center from that occupied by the pull-wire 12 and having a coil 15 loosely wrapped around the pull-wire 12, so as to be subject to movement on said pull-wire.

In the practical use of this device the parts are set for operation in the following manner: By exerting a pull upon the pull-wire 12 the operator draws the rocking trigger 10 and pull-rod 9 downwardly within the tube 2 to compress the expansion-spring 6 from the position seen in Fig. III into the condition illustrated in Fig. II. At the time that the spring 6 is so compressed the rocking trigger 10 has been drawn to a position beneath the shoulder-ring 7 in the lower end of the tube 2, and in order to hold it in that position the setting-wire 14 is grasped by the fingers of the operator and drawn upon to rock the trigger so that it will extend lengthwise across the interior of the tube, as seen in Fig. II, and rest against the lower edge of the shoulder-ring 7, where it will remain to hold the compressed spring from expanding. When in the use of the article a fish becomes hooked upon the line 4, its tugging upon said line exercises a pull upon the pull-wire 12, with the result that the trigger 10 is drawn downwardly from the shoulder-ring 7 and rocked on its central connection to the pull-wire 9, so that the trigger will extend in approximately longitudinal direction within the tube 2, so as to be capable of passing through the shoulder-ring 7, against which it previously rested. As soon as this action has taken place the spring 6 expands suddenly within the tube 2 and moves the parts into the position seen in Fig. III, thereby quickly drawing the hook on the fish-line into the fish to impale it thereon.

By placing the shoulder-ring 7 wholly within the lower end of the tube 2 it will be seen that the rocking trigger is completely protected to prevent its being struck by any obstacle that may be encountered by the float, and therefore accidental tripping of the trigger is avoided in the event of the trigger being exposed.

I claim as my invention—

1. In a fishing-float, the combination with a bob and fishing-line, of a tube in said bob, a shoulder within the lower end of said tube, an expansion-spring in said tube, a pull-rod connected to said spring, a rocking cam-trigger connected to said pull-rod and adapted to engage the shoulder within the lower end of said tube, and means for connecting said trigger to said fishing-line, substantially as described.

2. In a fishing-float, the combination with a bob and fishing-line, of a tube in said bob, a shoulder within the lower end of said tube, an expansion-spring in said tube, a pull-rod connected to said spring, a rocking cam-trigger connected to said pull-rod and adapted to engage the shoulder within the lower end of said tube, means for connecting said trigger to said fishing-line, and means for setting said trigger against said shoulder, substantially as described.

3. In a fishing-float, the combination with a bob and fishing-line, of a tube in said bob connected to said fishing-line, a shoulder-ring within the lower end of said tube, an expansion-spring located in said tube, a pull-rod connected to said spring, a rocking cam-trigger connected to said pull-rod and adapted to engage the shoulder-ring in said tube, and a pull-wire connected to said trigger and said fishing-line, substantially as described.

4. In a fishing-float, the combination with a bob and fishing-line, of a tube in said bob connected to said fishing-line, an expansion-spring located in said tube, a pull-rod connected to said spring, a rocking cam-trigger connected to said pull-rod and adapted to engage the lower end of said tube, a pull-wire connected to said trigger and said fishing-line, and a setting-wire connected to said trigger and loosely applied to said pull-wire, substantially as described.

5. In a fishing-float, the combination with a fishing-line, of a tube, an expansion-spring in said tube, a ring within said tube on which said spring is supported, a pull-rod connected to said spring, an elongated rocking trigger centrally connected to said pull-rod, a pull-wire having connection with said fishing-line and connected to said rocking trigger at one side of its center, and a setting-wire connected to said trigger at the opposite side of the center thereof and loosely applied to said pull-wire, substantially as described.

CHRISTOPHER HYMERS.

In presence of—
E. S. KNIGHT,
M. P. SMITH.